United States Patent [19]

Wambach

[11] 4,123,415
[45] Oct. 31, 1978

[54] REINFORCED THERMOPLASTIC POLYESTER COMPOSITIONS HAVING IMPROVED RESISTANCE TO HEAT DEFLECTION

[75] Inventor: Allen D. Wambach, Evansville, Ind.

[73] Assignee: General Electric Company, Pittsfield, Mass.

[21] Appl. No.: 747,636

[22] Filed: Dec. 6, 1976

[51] Int. Cl.² .................................................. C08K 3/40
[52] U.S. Cl. ..................................... 260/40 R; 260/860
[58] Field of Search ............................... 260/40 R, 860

[56] References Cited

U.S. PATENT DOCUMENTS

| | | | |
|---|---|---|---|
| 3,671,487 | 6/1972 | Abolins | 260/873 X |
| 3,915,926 | 10/1975 | Wambach | 260/860 X |
| 3,953,404 | 4/1976 | Borman | 260/75 M |

*Primary Examiner*—Sandra M. Person
*Attorney, Agent, or Firm*—Morgan, Finnegan, Pine, Foley & Lee

[57] ABSTRACT

Reinforced thermoplastic compositions are provided which comprise a high molecular weight polyester resin and a glass fiber reinforcement wherein the glass fibers have a maximum average standard diameter of about 0.0005 inches. The use of such glass fibers improves resistance to deflection by heat of fibrous glass reinforced compositions in comparison with a reinforced composition including glass fibers having an average standard diameter of greater than about 0.0005 inches.

13 Claims, No Drawings

REINFORCED THERMOPLASTIC POLYESTER COMPOSITIONS HAVING IMPROVED RESISTANCE TO HEAT DEFLECTION

This invention relates to reinforced thermoplastic compositions having improved retention of heat deflection properties. More particularly, it pertains to compositions comprising a high molecular weight polyester resin an a reinforcement therefore comprising glass fibers of no greater than 0.0005 inches in diameter, alone, or in combination with a mineral reinforcing filler. The reinforced compositions of this invention possess a greater ability to resist deflection by heat in comparison with corresponding glass fiber reinforced polyester compositions wherein the filament diameter is not limited to an average diameter of no greater than about 0.0005 inches.

BACKGROUND OF THE INVENTION

High molecular weight linear polyesters and copolyesters of glycols and terephthalic or isophthalic acid have been available for a number of years. These are described inter alia in Whinfield et al., U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

A useful family of such compositions are those which are glass-reinforced. For instance, Zimmerman, U.S. Pat. No. 3,814,725 discloses that improved molding resins are obtained by blending polyesters such as polypropylene terephthalate and polybutylene terephthalate with glass fibers.

It is known that when glass fibers having a standard diameter of 0.00051 to 0.00055 inches are used in various thermoplastic polyester formulations where the glass fiber concentration is less than 20%, the deflection temperature under load, as measured by the ASTM D-648 test, at 264 psi, is likely to be substantially less than 415° F., a value for typical polyester formulations having 30% glass by weight. Moreover, as the glass fiber concentration is reduced further below 20%, the heat deflection temperature is still further reduced. The heat deflection temperature is also reduced if a glass reinforced polyester is extruded more than once, as is the case where scrap material is reused by regrinding and then remolding or re-extruded into pellets for subsequent extrusion or molding. This reduction in the heat deflection temperature under load is undesirable when the thermoplastic polyester is to be used in applications involving exposure to elevated temperatures. At the same time, however, it is desirable to keep the glass fiber concentration low, in order to reduce the tendency of molded parts comprising glass reinforced polyesters to warp.

It has now been surprisingly discovered that by using glass fibers having a smaller average diameter, i.e., about 0.0005 inches or less, the heat deflection temperature is reduced to a much lesser extent. For example, in two polyester formulations containing, respectively, 7 and 11% by weight of glass fibers having an average diameter of 0.00037 inches, the deflection temperature under load, as measured by ASTM D-648, is 16° F. and 7° F. higher than control formulations containing glass filaments of a larger diameter. Even more significantly, after four re-extrusions (five extrusions total) prior to molding, the heat deflection of the subsequently molded parts was 37° and 28° F., respectively, greater than the larger diameter control. The extent of the difference is surprising in view of the relatively small change in glass fiber diameter.

DESCRIPTION OF THE INVENTION

According to this invention, there are provided reinforced thermoplastic compositions with improved heat deflection retention, the compositions being useful for molding, e.g., injection molding, compression molding, transfer molding, and the like, comprising:

(a) a high molecular weight polyester resin; and
(b) a reinforcement therefor comprising glass fibers, said glass fibers having an average standard diameter of no greater than about 0.0005 inches, wherein the glass fibers are present in an amount at least sufficient to provide reinforcement and to improve the resistance to deflection by heat of said composition in comparison with a reinforced composition including glass fibers having an average standard diameter of greater than about 0.0005 inches.

The high molecular weight normally flammable polyesters used in the present compositions are polymeric glycol esters of terephthalic acid and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539, and elsewhere.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula:

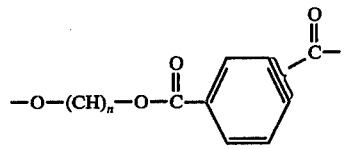

wherein $n$ is a whole number of from two to four, and mixtures of such esters, including copolyesters of terephthalic and isophthalic acids of up to about 30 mole % isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters/gram and preferably, at least 0.7 deciliters/gram as measured in a 60:40 phenol/tetrachloroethane mixture at 30° C.

Especially useful when high melt strength is important are branched high melt viscosity poly(1,4-butylene terephthalate) resins, which include a small amount, e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or, preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

In addition to the above-mentioned poly(alkylene terephthalate) resins, also contemplated herein are admixtures of such resins with polycarbonate resins, such as are disclosed in Okamura et al., U.S. Pat. No. 3,218,372, incorporated herein by reference.

The preferred polycarbonate resins will have recurring units of the formula:

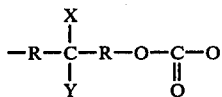

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining

atom form a cycloalkane radical, the total number of carbon atoms in X and Y being up to 12.

The preferred polycarbonate resins may be derived from the reaction of bisphenol-A and phosgene. These polycarbonates have from 100–400 recurring units of the formula:

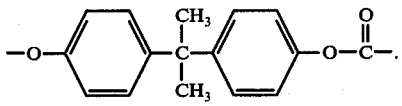

The polycarbonates are described in U.S. Pat. Nos. 3,028,365, 3,334,154 and 3,915,926, all of which are incorporated by reference to save further detail. The polycarbonate should have an intrinsic viscosity between 0.3 and 1.0, preferably from 0.3 to 0.45 as measured at 20° C. in methylene chloride.

It is essential that the glass fibers have an average standard diameter of no greater than about 0.0005 inches. Within this limitation, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling.

The length of the glass filaments and whether or not they are bundled into fibers and the fibers bundled in turn into yarns, ropes or rovings, or woven into mats, and the like, are also not critical to the invention. However, in preparing the present compositions, it is convenient to use the filamentous glass in the form of chopped strands of from about ⅛ inch to about 1 inch long, preferably less than ¼ inch long. In articles molded from the composition, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛) inch.

The amount of the glass fibers can vary broadly, e.g., from about 1 to about 60% by weight based on 100 parts by weight of the polyester resin and the glass. For high temperature applications, however, it is desirable to use a relatively small glass fiber concentration, e.g., from about 1 to about 20% by weight.

Especially preferred are glass fibers having an average standard diameter in the range of about 0.00010 to about 0.00040 inches.

The compositions of this invention can include, in addition to fibrous glass reinforcement of the type described, non-glass reinforcing fibers in combination therewith, such as mineral reinforcing fillers, e.g., talc, clay, silica, calcium silicate, mica, and the like.

Other ingredients, such as dyes, pigments, stabilizers, plasticizers, flame retardants, drip retardants, and the like can be added for their conventionally employed purposes. Illustrative flame retardant additives are disclosed in U.S. Pat. Nos. 3,833,685, 3,915,926 and 3,671,487, which are hereby incorporated by reference. Other flame retardants are disclosed in U.S. Pat. Nos. 3,681,281, and 3,557,053, 3,830,771 and U.K. Pat. No. 1,358,080, all of which are incorporated by reference.

The amount of flame retardant additive, if used, is not critical to the invention, so long as it is present in a minor proportion based on said composition — major proportions will detract from physical properties — but at least sufficient to render the block polyester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin.

Special mention is made of flame retardant additives consisting of aromatic carbonate homopolymers having repeating units of the formula:

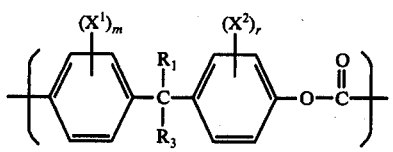

wherein $R^1$ and $R^2$ are hydrogen, (lower)alkyl or phenyl, $X^1$ and $X^2$ are bromo or chloro and $m$ and $r$ are from 1 to 4. These materials may be prepared by techniques well known to those skilled in the art. Also preferred are aromatic carbonate copolymers in which from 25 to 75 weight percent of the repeating units comprise chloro- or bromo-substituted dihydric phenol, glycol or dicarboxylic acid units. See, e.g., A. D. Wambach, U.S. Pat. No. 3,915,926, above-mentioned.

The compositions of this invention can be prepared by a number of procedures. In one way, the reinforcement, e.g., glass fiber, and, optionally, mineral filler, is put into an extrusion compounder with the polyester resin to produce molding pellets. The reinforcement is dispersed in a matrix of the polyester resin in the process. In another procedure, the reinforcement (b) is mixed with the polyester resin by dry blending, then either fluxed on a mill and comminuted, or they are extruded and chopped. The reinforcing agent can also be mixed with the powdered or granular polyester and directly molded, e.g., by injection or transfer molding techniques.

It is always important to thoroughly free all of the ingredients; resin, reinforcement and any optional, conventional additives from as much water as possible.

In addition, compounding should be carried out to ensure that the residence time in the machine is short; the temperature is carefully controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after carefully pre-drying the polyester resin and the reinforcing agent, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc. by standard techniques.

The composition can be molded in any equipment conventionally used for glass-filled thermoplastic compositions. For example, with poly(1,4-butylene terephthalate), good results will be obtained in an injection molding machine, e.g., of the Newbury type with conventional cylinder temperatures, e.g., 450° F. and conventional mold temperatures, e.g., 150° F. On the other hand, with poly(ethylene terephthalate), because of the lack of uniformity of crystallization from interior to exterior of thick pieces, somewhat less conventional but still well-known techniques can be used. For example, a nucleating agent such as graphite or a metal oxide, e.g., ZnO or MgO can be included and standard mold temperature of at least 230° F. will be used.

DESCRIPTION OF THE PREFERRED EMBODIMENTS

The following examples illustrate the invention. They are set forth as a further description but are not to be construed as limiting the invention thereto.

EXAMPLES 1–4

Dry blends of 87.85 parts by weight of poly(1,4-butylene terephthalate), 5 parts by weight of talc, 0.05 parts by weight of diphenyl decyl phosphite stabilizer and 7 parts by weight of glass fibers of the average diameters shown in Table 1 are compounded and extruded. The extrudate is pelletized and molded into test pieces which are evaluated for physical properties. The test results are summarized in Table 1.

TABLE 1.

Compositions of poly(1,4-butylene terephthalate), talc, diphenyl decyl phosphite and glass fibers having an average diameter of about 0.0005 inches or less

| EXAMPLE | 1 | 2 | 3 | 4 |
|---|---|---|---|---|
| Glass fiber diameter, inches | | | | |
| 0.00051 | 7 | — | — | — |
| 0.00037 | — | 7 | — | — |
| 0.00025 | — | — | 7 | — |
| 0.00012 | — | — | — | 7 |
| Properties | | | | |
| Heat Distortion Temp., ° F. | | | | |
| 264 psi | 361 | 356 | 375 | 377 |
| Warpage, mm | | | | |
| room temp. | less than 1 | 1 | 1 | 1.5 |
| 350° F./30 seconds | 7 | 4 | 10 | 7 |
| Notched Izod impact, ft.lbs./in. | 1.04 | 1.0 | 1.0 | 1.0 |
| Unnotched Izod impact, ft.lbs./in. | 8.0 | 7.9 | 11.4 | 12.2 |
| Flexural strength, psi | 18,100 | 18,400 | 19,500 | 19,850 |
| Flexural modulus, psi | 593,000 | 554,000 | 575,000 | 593,000 |
| Tensile strength at break, psi | 10,900 | 11,000 | 11,800 | 12,300 |

EXAMPLES 5–8

Dry blends containing the same ingredients and amounts shown in Examples 1–4 are compounded, extruded, and reextruded four times (five extrusions total). The extrudate is pelletized and molded. The glass fiber diameters and physical properties of the corresponding compositions are shown in Table 2.

TABLE 2.

Compositions of poly(1,4-butylene terephthalate), talc, diphenyl decyl phosphite and glass fibers after 4th reextrusion

| EXAMPLE | 5 | 6 | 7 | 8 |
|---|---|---|---|---|
| Glass fiber diameter, inches | | | | |
| 0.00051 | 7 | — | — | — |
| 0.00037 | — | 7 | — | — |
| 0.00025 | — | — | 7 | — |
| 0.00012 | — | — | — | 7 |
| Properties | | | | |
| Heat Distortion Temp., ° F. | | | | |
| 264 psi | 266 | 290 | 315 | 336 |
| Warpage, mm | | | | |
| room temp. | less than 1 | less than 1 | less than 1 | 1.0 |
| 350° F./30 seconds | 1.8 | 2 | 3.5 | 4.3 |
| Notched Izod impact, ft.lbs/in. | 0.8 | 0.8 | 1.0 | 1.1 |
| Unnotched Izod impact, ft.lbs./in. | 4.0 | 8.2 | 10.2 | 14.5 |
| Flexural strength, psi | 16,600 | 17,800 | 18,500 | 19,550 |
| Flexural modulus, psi | 537,000 | 537,000 | 583,000 | 573,000 |
| Tensile strength at | | | | |

TABLE 2.-continued

Compositions of poly(1,4-butylene terephthalate), talc, diphenyl decyl phosphite and glass fibers after 4th reextrusion

| EXAMPLE | 5 | 6 | 7 | 8 |
|---|---|---|---|---|
| break, psi | 9,200 | 10,000 | 10,900 | 11,800 |

EXAMPLES 9-12

Blends of 78.85 parts by weight of poly(1,4-butylene terephthalate), 10 parts by weight of talc, 0.05 parts by weight of diphenyl decyl phosphite and 11 parts by weight of glass fibers of the average diameters shown in Table 3 are prepared and molded as in Examples 1-4 and evaluated for physical properties. The results are summarized in Table 3.

TABLE 3.

Compositions of poly(1,4-butylene terephthalate), talc, diphenyl decyl phosphite and glass fibers having an average diameter of about 0.0005 inches or less

| EXAMPLE | 9 | 10 | 11 | 12 |
|---|---|---|---|---|
| Glass fiber diameter, inches | | | | |
| 0.00051 | 11 | — | — | — |
| 0.00037 | — | 11 | — | — |
| 0.00025 | — | — | 11 | — |
| 0.00012 | — | — | — | 11 |
| Properties | | | | |
| Heat Distortion Temp., °F. | | | | |
| 264 psi | 348 | 360 | 368 | 397 |
| Warpage, mm | | | | |
| room temp. | 14 | 5 | 7 | 6 |
| 350° F./30 seconds | 20 | 17 | 17 | 17 |
| Notched Izod impact, ft.lbs./in. | 1.0 | 1.1 | 1.1 | 1.2 |
| Unnotched Izod impact, ft.lbs./in. | 8.7 | 9.9 | 11.5 | 10.5 |
| Flexural strength, psi | 20,000 | 19,300 | 21,100 | 21,400 |
| Flexural modulus, psi | 747,000 | 661,000 | 747,000 | 747,000 |
| Tensile strength at break, psi | 11,900 | 11,600 | 12,800 | 13,100 |

EXAMPLES 13-16

Dry blends containing the same ingredients and amounts as in Examples 9-12 are compounded, extruded, reextruded four times (five extrusions total), pelletized and molded. The glass fiber diameter and physical properties are shown in Table 4.

TABLE 4.

Compositions of poly(1,4-butylene terephthalate), talc, diphenyl decyl phosphite and glass fiber after 4th reextrusion

| EXAMPLE | 13 | 14 | 15 | 16 |
|---|---|---|---|---|
| Glass fiber diameter, inches | | | | |
| 0.00051 | 11 | — | — | — |
| 0.00037 | — | 11 | — | — |
| 0.00025 | — | — | 11 | — |
| 0.00012 | — | — | — | 11 |
| Heat Distortion Temp., °F. | | | | |
| 264 psi | 324 | 313 | 357 | 355 |
| Warpage, mm | | | | |
| room temp. | less than 1 | 1 | 3 | 3 |
| 350° F./30 seconds | 8 | 8 | 14.5 | 14 |
| Notched Izod impact, ft.lbs./in. | 0.8 | 0.9 | 1.0 | 1.0 |
| Unnotched Izod impact, ft.lbs./in. | 8.7 | 9.5 | 10.4 | 12.6 |
| Flexural strength, psi | 18,000 | 19,100 | 20,600 | 21,100 |
| Flexural modulus, psi | 661,000 | 716,000 | 747,000 | 764,000 |
| Tensile strength at break, psi | 10,400 | 10,900 | 12,100 | 12,200 |

Obviously, other modifications and variations of the present invention are possible in the light of the above teachings. It is therefore to be understood that changes may be made in the particular embodiments of the invention described which are within the full intended scope of the invention as defined by the appended claims.

I claim:

1. A reinforced thermoplastic composition having improved retention of heat deflection temperature, said composition comprising:
   (a) a high molecular weight polyester resin; and
   (b) a reinforcement therefor comprising glass fibers, said glass fibers having an average standard diameter of no greater than about 0.0005 inches, wherein the glass fibers are present in an amount at least sufficient to provide reinforcement and to improve the resistance to deflection by heat of said composition in comparison with a reinforced composition including glass fibers having an average standard diameter of greater than about 0.0005 inches.

2. A composition as defined in claim 1 wherein said glass fibers have an average standard diameter in the range of 0.00010 to about 0.00040 inches.

3. A composition as defined in claim 1 wherein said glass fibers are present in an amount of from about 1 to about 60% by weight of the combined weights of (a) and (b).

4. A composition as defined in claim 1 wherein said polyester has an intrinsic viscosity of at least about 0.4 deciliters per gram when measured in a solution in a 60:40 mixture of phenol and trichloroethane at 30° C.

5. A composition as defined in claim 4 wherein said polyester has an intrinsic viscosity of at least about 0.7 deciliters per gram when measured in a solution in a 60:40 mixture of phenol and trichloroethane at 30° C.

6. A composition as defined in claim 1 wherein said polyester is selected from the group consisting of polymeric glycol terephthalate and isophthalate esters having repeating units of the formula:

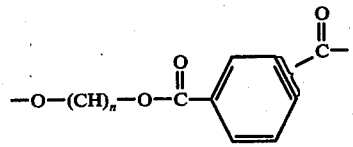

wherein n is a whole number of from 2 to 4, and mixture of such esters.

7. A composition as defined in claim 6 wherein said polyester resin is in admixture with a homopolycarbonate resin.

8. A composition as defined in claim 6 wherein said polyester is polyethylene terephthalate.

9. A composition as defined in claim 6 wherein said polyester is linear poly(1,4-butylene terephthalate) or a branched copolyester thereof.

10. A composition as defined in claim 6 wherein said branched copolyester is a high melt viscosity poly(1,4-butylene terephthalate) resin which includes a small amount of a branching component containing at least three ester forming groups.

11. A composition as defined in claim 1 wherein the reinforcement (b) includes a reinforcing amount of a mineral reinforcing filler.

12. A composition as defined in claim 11 wherein said mineral reinforcing filler is talc.

13. A composition as defined in claim 1 which also includes a flame retardant amount of a flame retardant additive.

* * * * *

Disclaimer and Dedication

4,123,415.–*Allen D. Wambach*, Evansville, Ind. REINFORCED THERMOPLASTIC POLYESTER COMPOSITIONS HAVING IMPROVED RESISTANCE TO HEAT DEFLECTION. Patent dated Oct. 31, 1978. Disclaimer and Dedication filed July 27, 1983, by the assignee, *General Electric Co.*

Hereby disclaims and dedicates to the Public the remaining term of said patent.

[*Official Gazette October 25, 1983.*]

REEXAMINATION CERTIFICATE (167th)

United States Patent [19]

Wambach

[11] B1 4,123,415

[45] Certificate Issued Feb. 21, 1984

[54] REINFORCED THERMOPLASTIC POLYESTER COMPOSITIONS HAVING IMPROVED RESISTANCE TO HEAT DEFLECTION

[75] Inventor: Allen D. Wambach, Evansville, Ind.

[73] Assignee: General Electric Company, Pittsfield, Mass.

Reexamination Request:
No. 90/000,203, May 24, 1982

Reexamination Certificate for:
Patent No.: 4,123,415
Issued: Oct. 31, 1978
Appl. No.: 747,636
Filed: Dec. 6, 1976

Certificate of Correction issued May 8, 1979.

[*] Notice: The portion of the term of this patent subsequent to Jul. 27, 1983, has been disclaimed and dedicated (1035 O.G. 28).

[51] Int. Cl.³ .............................................. C08K 3/40
[52] U.S. Cl. .................................. 524/451; 524/537; 524/605; 525/439
[58] Field of Search ............................... 524/605, 494

[56] References Cited

U.S. PATENT DOCUMENTS

| | | | |
|---|---|---|---|
| 3,368,995 | 2/1968 | Furukawa et al. | 260/40 |
| 3,645,962 | 2/1972 | Schwarz | 260/40 R |
| 3,740,371 | 6/1973 | Segal | 260/40 R |
| 3,859,246 | 1/1975 | Jackson, Jr. et al. | 260/40 R |
| 4,011,193 | 3/1977 | Wambach | 524/605 |
| 4,056,504 | 11/1977 | Grundmeier et al. | 260/37 PC |

FOREIGN PATENT DOCUMENTS

1010043 11/1965 United Kingdom .
1102844 2/1968 United Kingdom .

*Primary Examiner*—L. T. Jacobs

[57] ABSTRACT

Reinforced thermoplastic compositions are provided which comprise a high molecular weight polyester resin and a glass fiber reinforcement wherein the glass fibers have a maximum average standard diameter of about 0.0005 inches. The use of such glass fibers improves resistance to deflection by heat of fibrous glass reinforced compositions in comparison with a reinforced composition including glass fibers having an average standard diameter of greater than about 0.0005 inches.

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

Claims 1-13, having been finally determined to be unpatentable, are cancelled.

* * * * *